(12) United States Patent
Kim

(10) Patent No.: US 8,202,084 B2
(45) Date of Patent: Jun. 19, 2012

(54) METHOD FOR PREVENTING COAGULATION IN EXHAUST PIPE OF BOILER

(75) Inventor: Yong Bum Kim, Incheon (KR)

(73) Assignee: Kyungdong Navien Co., Ltd., Gyeonggi-Do (KR)

( * ) Notice: Subject to any disclaimer, the term of this patent is extended or adjusted under 35 U.S.C. 154(b) by 393 days.

(21) Appl. No.: 12/445,733

(22) PCT Filed: Oct. 17, 2007

(86) PCT No.: PCT/KR2007/005092
§ 371 (c)(1),
(2), (4) Date: Apr. 15, 2009

(87) PCT Pub. No.: WO2008/048049
PCT Pub. Date: Apr. 24, 2008

(65) Prior Publication Data
US 2010/0316963 A1    Dec. 16, 2010

(30) Foreign Application Priority Data
Oct. 17, 2006    (KR) ........................ 10-2006-0100748

(51) Int. Cl.
| | |
|---|---|
| *F23N 1/02* | (2006.01) |
| *F23L 7/00* | (2006.01) |
| *F23J 15/00* | (2006.01) |
| *E04F 17/02* | (2006.01) |
| *B60S 1/54* | (2006.01) |
| *G05D 23/00* | (2006.01) |

(52) U.S. Cl. ......... 431/12; 431/2; 431/5; 454/1; 454/85; 165/287

(58) Field of Classification Search .................... 431/12, 431/2, 5; 454/1, 85
See application file for complete search history.

(56) References Cited

U.S. PATENT DOCUMENTS
| | | | | |
|---|---|---|---|---|
| 4,637,349 | A | * | 1/1987 | Robinson .................... 122/448.3 |
| 5,190,215 | A | * | 3/1993 | Habermehl et al. ......... 236/91 F |
| 5,732,691 | A | * | 3/1998 | Maiello et al. ............. 126/116 A |
| 6,295,937 | B1 | * | 10/2001 | Nakanishi et al. ............ 110/190 |

FOREIGN PATENT DOCUMENTS
| | | |
|---|---|---|
| JP | 61-153338 | 7/1986 |
| JP | 01-212817 | 8/1989 |
| KR | 10-1996-0041948 | 12/1996 |
| KR | 10-2006-0038814 | 5/2006 |

* cited by examiner

*Primary Examiner* — Kenneth Rinehart
*Assistant Examiner* — William Corboy
(74) *Attorney, Agent, or Firm* — Hershkovitz & Associates, LLC; Abraham Hershkovitz

(57) ABSTRACT

A method for preventing coagulation in an exhaust pipe of a boiler is provided. The method includes proportionally controlling combustion based on a quantity of supplied fuel with respect to an amount of air supplied to a burner, determining whether to enhance a heating power of a burner, based on a temperature of ambient air introduced into a blower, the temperature of the ambient air being sensed by an air temperature sensor, and enhancing the heating power of the burner to increase a temperature of exhaust gas, when it is determined that the sensed temperature is equal to or lower than a predetermined temperature.

4 Claims, 2 Drawing Sheets

METHOD FOR PREVENTING COAGULATION IN EXHAUST PIPE OF BOILER

RELATED APPLICATIONS

This is an US National Phase Patent Application Under 35 USC §371 of International Patent Application No. PCT/KR2007/005092, filed on Oct. 17, 2007, which claims priority of Korean Patent Application No. 10-2006-0100748, filed on Oct. 17, 2006.

BACKGROUND OF THE INVENTION

1. Field of the Invention

The present invention relates to a method for preventing coagulation in an exhaust pipe of a boiler, and more particularly to a method for preventing coagulation in an exhaust pipe of a proportional control boiler, in which a temperature of ambient air discharged through an exhaust pipe of the boiler is raised, thereby preventing coagulation of steam contained in exhaust gas.

2. Discussion of Background Information

FIG. 1 is a schematic view illustrating an exhaust structure of a conventional boiler.

In the conventional boiler, ambient air introduced through an air supply pipe 10 is supplied to a burner 30 together with fuel by means of a blower 20, and exhaust gas generated due to the combustion in the burner 30 is heat-exchanged with space heating water transferred by a circulation pump 50 in a, heat exchanger 40, and then the heat-exchanged exhaust gas is discharged to an outside of the boiler, i.e., to the air, through an exhaust pipe 60.

The exhaust gas includes a substantial amount of $H_2O$, and the temperature of the exhaust gas is generally equal to or higher than 100° C., so that moisture contained in the exhaust gas is discharged to the outside in a state of steam without being condensed through the exhaust pipe 60.

However, when the temperature of ambient air is very low, such as in winter, a case occurs where the temperature of an end portion of the exhaust pipe 60 drops low enough to reach or fall below a dew point temperature at which the steam contained in the exhaust gas starts to be condensed, and is generally 40° C.-55° C. In this case, the steam is condensed at the end portion of the exhaust pipe 60.

Further, in this case, when the temperature of ambient air is below zero, the steam condensed at the end portion of the exhaust pipe 60 freezes to form icicles. The icicles hanging from the exhaust pipe not only are unseemly, but also may cause damage to lives and properties if the icicles fall from an upper floor of a tall building.

Conventionally, a method for raising the temperature of the exhaust gas in order to prevent creation of icicles at the end portion of the exhaust pipe and a method for insulating an outside of the exhaust pipe in order to prevent a drop in temperature of the end portion of the exhaust pipe have been proposed.

Here, the temperature of the exhaust gas is related to the efficiency of the boiler. As such, in order to raise the temperature of the exhaust gas as proposed by the conventional method for preventing creation of icicles at the end portion of the exhaust pipe, it is inevitable to lower the efficiency of the boiler, thereby resulting in a waste of energy.

Further, in order to insulate the outside of the exhaust pipe, the conventional method requires a complex structure and higher cost due to the use of insulating materials.

Therefore, the present invention has been made in view of the above-mentioned problems, and it is an object of the present invention to provide to a method for preventing coagulation in an exhaust pipe of a boiler, in which, when ambient air temperature is equal to or lower than a predetermined temperature, the temperature of the space heating pipe water is raised and a blower is then rotated to discharge warm air through the exhaust pipe, thereby preventing coagulation of steam and creation of icicles (ice formation) at an end portion of the exhaust pipe of the boiler.

SUMMARY OF THE INVENTION

To accomplish the above objects, there is provided a method for preventing coagulation in an exhaust pipe of a boiler. The method includes the steps of: proportionally controlling combustion based on a quantity of supplied fuel with respect to an amount of air supplied to a burner; determining whether to enhance heating power of a burner based on a temperature of ambient air introduced into a blower, the temperature of the ambient air being sensed by an air temperature sensor; and enhancing the heating power of the burner to increase a temperature of exhaust gas when it is determined that the sensed temperature is lower than a predetermined temperature.

Further, the step of determining whether to enhance the heating power of the burner can include a step of determining if the burner has been operated during a predetermined time interval while consuming a predetermined quantity of gas.

Further, the step of proportionally controlling combustion can be executed when a combustion time duration of the enhanced heating power in the burner exceeds a predetermined time interval.

Further, in the step of enhancing the heating power of the burner, a controller can have multiple preset temperature stages for ambient air temperature, and the multiple temperature stages are set to be executed for different time durations in order to enhance the heating power of the burner.

Further, in the enhancing the heating power of the burner, combustion is executed with, for example, a maximum heating power of the burner when the sensed ambient air temperature is equal to or lower than the predetermined temperature.

As described above, according to the method of the present invention, when the ambient air temperature is equal to or lower than the temperature at which steam freezes, such as in winter, heating power of the burner may be enhanced to burn with, for example, maximum heating power, so as to raise the temperature of the exhaust gas discharged through the exhaust pipe, thereby preventing coagulation of steam and creation of icicles at the end portion of the exhaust pipe of the boiler.

Further, when combustion is executed with, for example, a maximum heating power of the burner and its combustion time duration exceeds a predetermined time interval, a mode for proportional control of combustion is returned, so that it can prevent unnecessary fuel consumption.

DETAILED DESCRIPTION OF EMBODIMENTS

Figure 1:
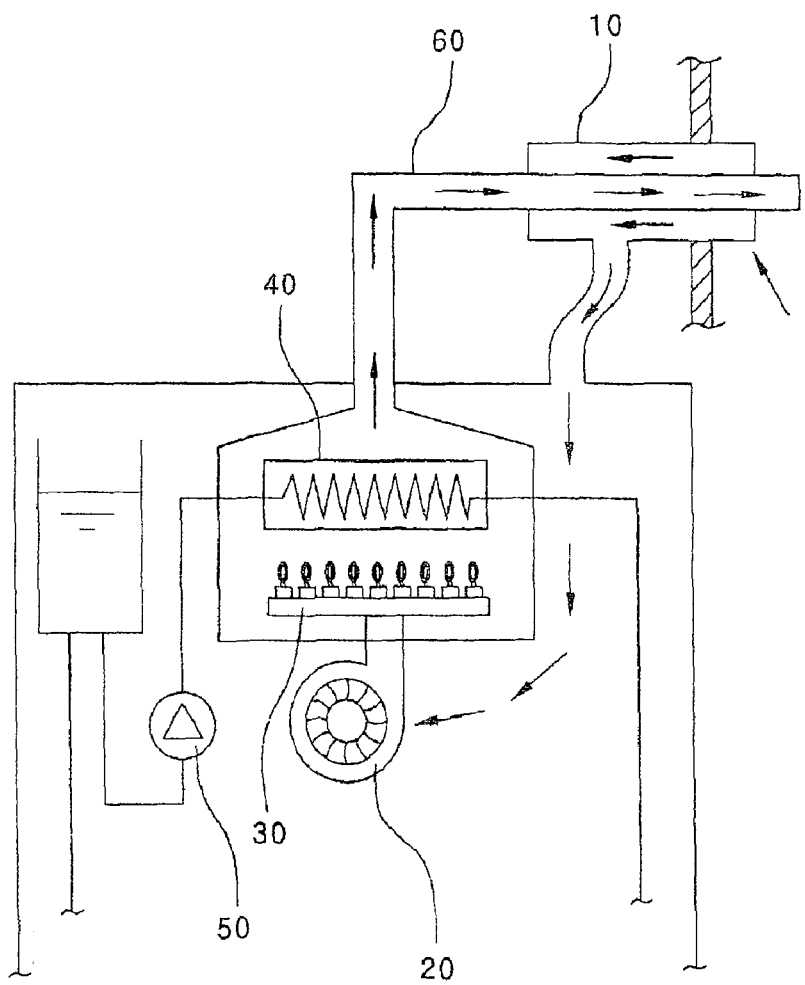
FIG. 1 is a schematic view illustrating an exhaust structure of a conventional boiler.

Hereinafter, an embodiment of the present invention will be described with reference to the accompanying drawings. In the following description and drawings, the same reference numerals are used to designate the same or similar components, and so repetition of the description on the same or similar components will be omitted.

A proportional control boiler which changes heating power of a burner proportional to the load quantity within a predetermined range has been widely used due to users' convenience in space heating and water heating. The proportional control boiler controls the quantity of fuel and air in accordance with a required level of heating power of the burner as necessary to perform combustion, wherein the quantity of gas consumption can be decreased up to 30% through 40% of the maximum quantity of gas consumption.

Figure 2:
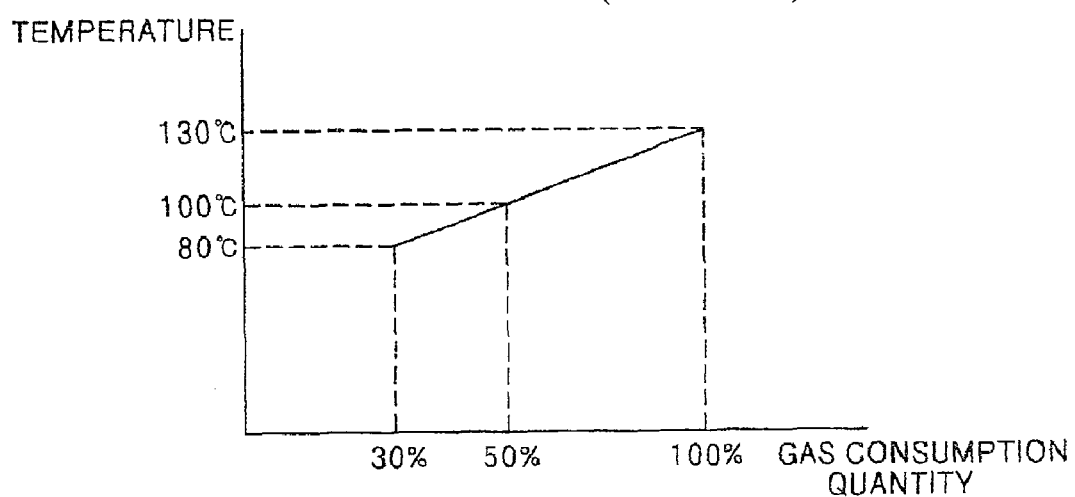
FIG. 2 is a graph showing a relation between a quantity of gas consumption and a temperature of exhaust gas in a conventional proportional control boiler.

FIG. 2 is a graph showing a relation between the quantity of gas consumption and the temperature of exhaust gas in a conventional proportional control boiler. Particularly, the graph shows the relation between the quantity of gas consumption and the temperature of exhaust gas in a circumstance where the temperature of space heating return water supplied to a heat exchanger is 30° C., and the temperature of space heating supply water passing through the heat exchanger and being supplied to a pipe for the space heating is 50° C.

Referring to FIG. 2, when the quantity of gas consumption is decreased, the temperature of the exhaust gas also falls, and when the temperature of the exhaust gas falls, the cooling of the exhaust pipe easily occurs under the condition of the temperature of ambient air, so that the exhaust pipe can be cooled to equal to or lower than the dew point temperature of the exhaust gas.

When the exhaust pipe is cooled to equal to or lower than the dew point temperature of the exhaust gas, steam contained in the exhaust gas passing through the inside of the exhaust pipe is condensed to adhere at an end portion of the exhaust pipe. The adhered water at the end portion of the exhaust pipe comes to freeze when the ambient air temperature is below zero, thereby forming icicles.

In the proportional control boiler, as shown in FIG. 2, if the quantity of gas consumption is decreased so as to lower the temperature of the exhaust gas discharged through the exhaust pipe (for example, in a case where the quantity of gas consumption is 50%, and the temperature of the exhaust gas is 100° C.) and if the sensed temperature of the ambient air is equal to or lower than a predetermined temperature, i.e. such as in winter, so that it is determined that coagulation in the exhaust pipe occurs at the sensed temperature, there is a need that the heating power of the burner should be enhanced so as to raise the temperature of the exhaust gas. Thus, a control method of the present invention is provided to meet this need. The control method will be described in detail with reference to FIG. 3.

In order to implement the control method according to the present invention, an ambient air temperature sensor (not shown) is mounted outdoors or in an inlet of an air supply blower 20 of the boiler so as to sense the ambient air temperature.

Figure 3:
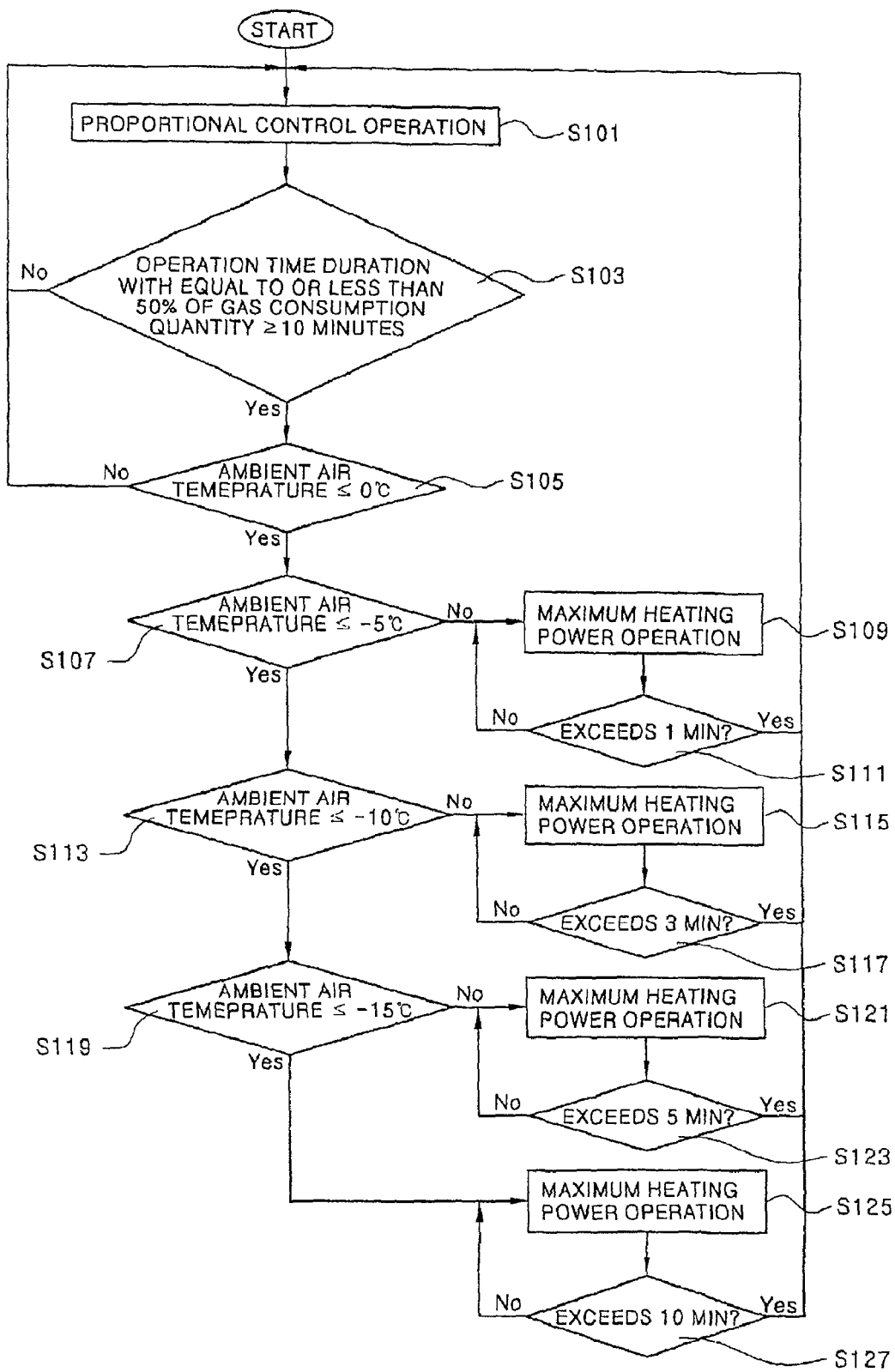
FIG. 3 is a flowchart illustrating a control method according to an exemplary embodiment of the present invention.

FIG. 3 is a flowchart illustrating the control method according to an exemplary embodiment of the present invention.

When the boiler starts its operation, the method can begin with a step of proportionally controlling combustion where a controller controls the quantity of air and fuel proportional to the load quantity so as to control the heating power of the burner S101.

The controller can determine if the burner has been operated during a predetermined time interval while consuming equal to or less than a predetermined quantity of gas S103. Further, the controller can determine if the ambient air temperature is equal to or lower than the predetermined temperature S105 so as to determine whether to enhance the heating power of the burner.

For example, when the quantity of gas consumption is equal to or less than 50%, the temperature of the exhaust gas falls below 100° C. so that the controller determines that steam is condensed in the exhaust pipe, and then determines if the above state maintains equal to or more than 10 minutes. If the quantity of gas consumption is equal to or less than 50% and the operation time duration exceeds 10 minutes, and if the ambient air temperature measured by an ambient air temperature sensor is equal to or lower than 0° C., it is determined that coagulation of the steam has occurred. Accordingly, the step of enhancing the heating power of the burner is executed. However, if it fails to meet the above conditions, the burner maintains the proportionally controlling operation state S101.

In the present embodiment, the controller can have multiple preset temperature stages for the ambient air temperature. Further, the multiple temperature stages, each having an interval of 5° C., are set to be executed for different time durations in order to enhance the heating power of the burner.

For example, if the ambient air temperature is equal to or lower than 0° C., the controller determines if the ambient air temperature is equal to or lower than −5° C. S107. When the ambient air temperature is between 0° C. and −5° C., the heating power of the burner is enhanced so that the burner is operated with the maximum heating power. In this example, the controller determines if the operation time duration with the maximum heating power exceeds 1 minute S111. If the operation time duration with the maximum heating power exceeds 1 minute, it is determined to be sufficient for preventing coagulation of steam at the end portion of the exhaust pipe so as to return to the step of the proportionally controlling combustion. However, if the operation time duration with the maximum heating power does not exceed 1 minute, the operation is maintained with the maximum heating power.

As another example, if the ambient air temperature is equal to or lower than −5° C., the controller determines if the ambient air temperature is equal to or lower than −10° C. S107 S113. When the ambient air temperature is between −5° C. and −10° C. S115, the operation is executed with the maximum heating power S115. In this example, the temperature is lower than the ambient air temperature of between 0° C. and −5° C., so that the operation time duration with the maximum heating power further extends so as to operate for 3 minutes with the maximum heating power S117.

As another example, when the ambient air temperature is between −10° C. and −15° C. S119, the operation is executed for 5 minutes S121 and S123. When the ambient air temperature is equal to or lower than −15° C., the operation is executed for 10 minutes with the maximum heating power S125 and S127.

In the step of enhancing the heating power of the burner, the combustion time duration with the enhanced heating power of the burner (maximum heating power combustion time duration) is set differently based on the temperature stages of the ambient air so as to minimize the time duration for operating with the maximum heating power, thereby preventing wasting of fuel.

The modification of an interval of stages of the ambient air and an execution time duration for enhancing the heating power of the burner is easily implemented by those skilled in the art.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

According to the present invention, even though the ambient air temperature is equal to or lower than the predetermined temperature, coagulation of steam and creation of icicles at the end portion of the exhaust pipe of the boiler can be prevented.

The invention claimed is:

1. A method for preventing coagulation in an exhaust pipe of a boiler, the method comprising:

controlling combustion proportionally based on a quantity of supplied fuel with respect to an amount of air supplied to a burner;

determining whether to enhance a heating power of a burner, based on a temperature of ambient air introduced into a blower, the temperature of the ambient air being sensed by an air temperature sensor; and enhancing the heating power of the burner to increase a temperature of exhaust gas, when it is determined that the sensed temperature is equal to or lower than a predetermined temperature, wherein the determining whether to enhance the heating power of the burner comprises determining if the burner has been operated during a predetermined time interval while consuming a predetermined quantity of fuel.

2. The method according to claim 1, wherein the proportionally controlling combustion is executed when a combustion time duration of the enhanced heating power of the burner exceeds a predetermined time interval.

3. The method according to claim 2, wherein the enhancing the heating power of the burner is executed for at least one predetermined period of time corresponding to at least one range of ambient air temperatures.

4. The method according to claim 2, wherein the enhancing the heating power of the burner includes enhancing the heating power of the burner with a maximum heating power.

* * * * *